United States Patent [19]

Barabas

[11] Patent Number: 4,853,439
[45] Date of Patent: Aug. 1, 1989

[54] WATER-SOLUBLE COMPLEXES OF WATER-INSOLUBLE ORGANIC COMPOUNDS

[75] Inventor: Eugene S. Barabas, Watchung, N.J.

[73] Assignee: GAF Corporation, Wayne, N.J.

[21] Appl. No.: 106,845

[22] Filed: Oct. 9, 1987

[51] Int. Cl.$^4$ ................................................ C08F 8/34
[52] U.S. Cl. .................................. 525/326.9; 525/348; 525/349; 525/359.1; 525/359.2; 525/375
[58] Field of Search ...................... 525/326.9, 348, 349, 525/359.1, 359.2, 375

[56] References Cited

U.S. PATENT DOCUMENTS

| | | | |
|---|---|---|---|
| 4,151,185 | 4/1979 | Allcock et al. | 525/326.9 |
| 4,328,026 | 5/1982 | Kliegman et al. | 525/326.9 |
| 4,345,049 | 8/1982 | Denzinger et al. | 525/326.9 |
| 4,433,112 | 2/1984 | Straub et al. | 525/326.9 |
| 4,678,838 | 7/1987 | Janssen | 525/326.9 |

*Primary Examiner*—Joseph L. Schofer
*Assistant Examiner*—Bernard Lipman
*Attorney, Agent, or Firm*—Jules E. Goldberg; Marilyn J. Maue; Joshua J. Ward

[57] ABSTRACT

A novel, highly water soluble complex of a substantially insoluble organic compound and a solid homopolymer or copolymer of N-vinyl-2-pyrrolidone. The complex exhibits water solubilities in excess of about 25-fold that of the insoluble organic compound. A method for producing the complex is disclosed wherein the polymer and insoluble compound are dissolved in a mutual solvent, allowed to react for a period of time sufficient to form the complex, and then the solvent is removed to produce the dried highly water-soluble complex.

16 Claims, No Drawings

WATER-SOLUBLE COMPLEXES OF WATER-INSOLUBLE ORGANIC COMPOUNDS

BACKGROUND OF THE INVENTION

A major difficulty encountered with many organic compounds, particularly those of higher molecular weight and/or those having relatively complicated formulas, such as, pharmaceuticals, is that they are highly insoluble in water. This places significant limitations on the potential uses of these materials. For example, for those organic compounds which are used for industrial purposes, normally, a wide variety of organic solvents can be used. However, such solvents often present problems from the standpoint of cost and/or environmental impact. As a result, normally associated with the use of such organic solvents is the problem of their recovery so as to minimize the cost involved with their use, or their neutralization in the sense that the solvents no longer present an environmental or health hazard to humans or animals.

It is thus desirable that such compounds, rather than being utilized in organic solvents, be dissolved in water as the solvent. However, because of the nature of the organic compounds, it is often impossible to achieve a sufficiently high concentration of the organic material in water to facilitate the particular industrial use or chemical reaction desired.

This is particularly so with organic compounds which are used for agricultural purposes, such as, herbicides, pesticides, and the like. Thus, such compounds are normally applied to the plants and/or the earth in which the plants are growing and the best means of transporting the material into the plant or the earth is through water transport. However, because of the insolubility of many of these compounds, it is necessary to formulate them into emulsions or dispersions, usually in the presence of appropriate surface-activating agents, e.g., surfactants, and the like. The formulation of such emulsions increases the expense and manpower in the utilization of these agricultural chemicals. In addition, very often the efficiency of transport into the ecological system is not as high as desired. The ability to dissolve compounds of this nature in water in high concentrations would represent a significant achievement in this area of use.

With respect to pharmaceutical compounds, water is, of course, the solvent choice. Indeed, it is normally impossible to use organic solvents as carriers for pharmaceuticals because of the toxicity associated with organic materials or solvents. Moreover, with pharmaceuticals which are used either for oral or injectable dosages, it is desired to have a higher rather than a lower concentration in water, since this decreases the particular amount of the material needed in any given dosage. Often, however, it is extremely difficult to obtain any significant or effective degree of solubility of such compounds in water so as to enhance their pharmaceutical efficacy.

In the past, it has been known that the use of polyvinylpyrrolidone could be used to increase the rate of dissolution of certain organic compounds in water. However, this art does not relate to an increase in solubility, but rather, only to an increase in the rate of dissolution. See L. M. Mortada, "Effect of Polyvinylpyrrolidone and Urea on Dissolution Rate of Phenylbutazone from Solid State Dispersion", Sci. Pharm. 48, 241-247 (1980); O. I. Corregan, R. F. Timony and M. J. Whelan "The Influence of Polyvinylpyrrolidone on the Dissolution and Bioavailability of Hydrochlorothiazide", J.Phar. Pharmac. 28, 703 (1976); and R. Voight and D. Terborg, "Granulometric Determination of the Effect of PVP on Dissolution Rates of Sparingly Soluble Drugs", Pharmazie, 35, 311-312 (1980).

Numerous methods have been utilized for enhancing the solubility of complicated organic chemicals. For example, in U.S. Pat. No. 3,673,163, a method is described for the us of polyvinylpyrrolidone having molecular weights in excess of 1,000 by coprecipitating the polyvinylpyrrolidone with the drug Acronine. However, the increase in solubility obtained was only about 2.5 times the solubility of the compound. Such an increase in solubility for many of these compounds is not sufficient to render the use of the compound effective from commercial or practical point of view.

SUMMARY OF THE INVENTION

I have discovered a method for substantially increasing the water solubility of highly insoluble organic compounds in the range of at least 25 times the solubility of the compounds alone as measured at 25° C. at atmospheric pressure. Indeed, I have discovered a method for increasing the solubility of such compounds in many cases in excess of 100 times their original solubility.

This is accomplished by forming a novel complex product from the reaction between the organic compound and a solid homopolymer or copolymer of N-vinyl-2-pyrrolidone having a weight average molecular weight of greater than 1,000. Particularly, for compounds for use in pharmaceutical enduses, weight average molecular weights in the range from about 10,000 to 40,000 are best. However, for compounds for other industrial uses, molecular weights as high as 500,000 or more are suitable.

The process of the invention is carried out by dissolving the solid polymer or copolymer of N-vinyl-2-pyrrolidone and the organic compound in a mutual solvent. As used herein, the term "mutual solvent" means a solvent in which each of the solid polymer and the organic compound are highly soluble.

The dissolved mixture is then treated for a period of time sufficient to effect the complexing reaction. Thereafter, the solvent is removed to produce the solid complex.

DESCRIPTION OF THE PREFERRED EMBODIMENT

As noted, a homopolymer of N-vinyl-2-pyrrolidone or a copolymer of this monomer with another monomer may be used in accordance with the present invention. In such copolymers, the amount of vinyl lactam in the copolymer should be between about 50% and about 95% by weight, preferably between about 50% and about 85% by weight. The complexed product of this invention may contain a number of noncomplexed lactam sites. When a copolymer is used, one factor affecting the number of non-complexed sites is the amount of vinyl lactam contained in the copolymer.

The weight average molecular weight of the polyvinylpyrrolidone or copolymer should be sufficiently high such that the polymer is a solid. In particular, the weight average molecular weight of the polymer is preferably between about 10,000 and 40,000. Such polymers are capable of complexing the water insoluble compounds to a higher degree, such that about 8% up to about 30% of the complexing sites on the polymer are reacted with the particular water insoluble organic compound.

In particular, vinyl lactam copolymers which contain N-vinyl-2-pyrrolidone monomer and a comonomer which form a water soluble copolymer can be used. Included are monomers selected from the group of a di-lower alkylamino lower alkyl-acrylate or -methacrylate, e.g., dimethylamino ethyl-acrylate or -methacrylate, a di, lower alkylamino lower alkyl-styrene, e.g., dimethylamino methylstyrene or N-vinylimidazole. The above copolymers can be unquaternized or quaternized. Particularly preferred are the comonomers containing —COOH or anhydride units, for example, maleic anhydride or maleic acid, acrylic acid, methacrylic acid and acid amides, such as, acrylamide.

The complexes of the present invention are prepared by dissolving the organic compound and the polyvinylpyrrolidone or copolymer thereof in an appropriate mutual solvent. Such mutual solvents can include alcohols, such as, $C_1-C_5$ alcohols, and preferably, ethanol. Also suitable are carboxylic acids, such as, formic acid, acetic acid, and propionic acid, ether alcohols, such as, glycol ethers, diethylene glycol, triethylene glycol, hexamethylene glycol, polyethylene glycol, 2,2'-thiodiethanol.

Other solvents may also be used, e.g., lactones, esters, ketones, chlorinated hydrocarbons, lactams, amides and amines, as well as nitroparaffins. Normally, such materials would be less desirable from a commercial standpoint inasmuch as they are generally more expensive than the first-mentioned solvents and, in the case of pharmaceuticals, must be completely removed from the solid material so that they are not present, except as undetectable trace amounts. The essential characteristic of the mutual solvent is that both the polyvinylpyrrolidone polymer and/or copolymer and the water insoluble organic compound be highly soluble in the solvent chosen.

In certain instances, a salt of the water insoluble compound can be formed in aqueous or alcoholic alkaline solution, e.g., NaOH containing water or KOH in ethanol. While such a solution is not a solvent in the theoretical sense, it serves the purpose of the present invention and is thus included with the definition of mutual solvents as used herein.

A wide variety of substantially water insoluble organic compounds may be used for forming the complexes of the present invention. Such compounds are disclosed in U. S. Pat. No. 4,666,992, and copending applications Serial Nos. 858,778, filed May 2, 1986; 858,635, filed May 2, 1986; 858,976, filed May 2, 1986; 849,918, filed April 9 1986; 858,977, filed May 2, 1986; and 858,978, filed May 2, 1986, the disclosures of all of which are incorporated herein by reference.

As used herein, the expression "substantially insoluble" means that the solubility of the compound in water is so low as to render its use in aqueous solution impractical or highly inefficient, e.g., for insoluble pharmaceuticals.

In addition to the compounds disclosed in the above patents and/or copending applications, I have discovered that additional insoluble compounds may be treated using the present invention. In particular, those compounds which are especially adapted for hydrogen bonding, polar bonding, hydrophobic bonding, ionic bonding, and bonding by van der Waals forces are highly susceptible to a complexing with the polyvinylpyrrolidone and copolymers thereof utilized in the present invention to produce complexes exhibiting solubilities which are extremely high multiples of the solubility of the original organic compound.

The process of the present invention is carried out by first dissolving the polyvinylpyrrolidone and the compound to be complexed in the mutual solvent. This can be done separately followed by mixing of the two solutions or in the same solution. Preferably each of the solutions contains a concentration of between about 5 to 25 weight percent of the polyvinylpyrrolidone and/or copolymer and the water insoluble compound. Most preferably, solutions of from about 8 to about 15% by weight of the components are preferred.

The solutions are then combined in a weight ratio of polyvinyl pyrrolidone to water insoluble organic compound of between about 1:1 and about 10:1., preferably, in a ratio of from about 4 to 7:1. The solutions are thoroughly mixed under atmospheric pressure or under a superatmospheric pressure up to about 50 psig. at a temperature above 3° C. and below the boiling point of the mutual solvent. Preferably, the temperature range would be between about 4° C. and 100° C. and most preferably, between about $10°$ C. and about 40° C. Of course, the temperature must be kept below that value which would result in deterioration or degradation of the organic compound. The mixture is agitated under such conditions for a period of from about 5 minutes to about 3 hours and most preferably, between about 10 and 30 minutes in order to complete the complexing reaction.

After the completion of the reaction the resulting mixture comprises a liquid phase which contains the complex. The solvent is then removed by conventional means, such as, rotary evaporation, freeze drying, and the like. Rotary evaporation may be conducted in a vacuum, such as, under a pressure of from about 2 to about 40 mm of Hg, and preferably not more than 25 m of Hg. These particular parameters depend on the particular mutual solvent used as well as the nature of the insoluble organic component, the primary factor being that the conditions used must not deteriorate the organic compound. The remaining solids are recovered and dried in order to remove traces of the solvent.

The dried products may then be readily dissolved in water which produces the formerly insoluble organic compound in a highly dissolved state in aqueous solution.

In those instances where the mutual solvent is an aqueous or alkanolic alkaline solution, after drying, the product which is the salt, is placed in solution and the pH is adjusted to the neutral or acid side to produce the complex of the insoluble compound in solution, rather than its salt.

The following examples illustrate the present invention:

EXAMPLE 1

Trifluralin (0.5 gm.) (2,6-dinitro-N,N-dipropyl-4-(trifluoromethyl)benzenamine) was dissolved in 50 gm. of ethanol and poured into a dropping funnel. 2.5 gm. of a homopolymer of poly(N-vinyl-2-pyrrolidone) having an average molecular weight of 40,000 was dissolved in 50 gm. of ethanol and poured into a separate dropping funnel. The two solutions were gradually mixed over a period of 15 minutes at room temperature and atmospheric pressure with agitation in a 2,000 ml. flask. The mixture was stirred for an additional 10 minutes and the flask was then transferred to a rotary evaporator under about 20 mm. of Hg pressure to remove the ethanol solvent. The solid remaining after evaporation was dried under a vacuum of 20 ml. Hg at 60° C. overnight.

0.001 gm. were transferred to a screw-top jar and mixed with 2.0 gm. of distilled water on a horizontal shaker for 6 hours at room temperature. After this period, the solid was completely dissolved. The concentration of the trifluralin was 0.000083 gm./ml. as compared to the concentration of the uncomplexed material which is 0.3 ppm. This represents a 277-fold increase in solubility.

EXAMPLE 2

Sulfathiazole (5 gm.) was dissolved in 45 gm. of a 2% aqueous solution of sodium hydroxide and the solution was added to a dropping funnel. A homopolymer of N-vinyl-2-pyrrolidone having an average molecular weight of 40,000 (20 gm.) (PVP K-30 from GAF Corporation) was separately dissolved in 180 gm. of an aqueous 2% sodium hydroxide solution and poured into a separate dropping funnel. 50 gm. of the sulfathiazole solution and 200 gm. of the polyvinylpyrrolidone solution were charged drop-wise over a period of 15 minutes to a 500 ml. flask and the resulting solution was agitated for 15 minutes at room temperature. The pH of the reaction mixture was about 8.5. The liquid was then evaporated under about 20 mm. of Hg to remove the solvent and the resulting solid was dried under a similar vacuum at 60° C overnight.

In a screw-top jar, 2 gm. of the solid which was the sodium salt of the complex of poly (N-vinyl-2-pyrrolidone) and sulfathiazole were agitated on a horizontal shaker at room temperature with 20 gm. of distilled water which corresponded with 0.4 gm. of the pure drug. After about one half hour, a clear solution was obtained. The pH was adjusted to 3.8 with concentrated hydrochloric acid solution. The polymer-sulfathiazole complex remained in solution at this pH.

Additional amounts of the salt, in 2 gm increments, were added to the clear liquid and the pH of the solution was adjusted to the acid side after each addition. After each addition, a clear solution was obtained up to a concentration of 36 gm. of the sulfathiazole complex in 20 gm. water which corresponded to 7.2 gm. of sulfathiazole. The solubility of sulfathiazole in water is 0.00006 gm./ml. Accordingly, a 6000-fold increase in the solubility of sulfathiazole is obtained with the present invention.

EXAMPLE 3

Furosemide (5 gm.) was dissolved in 45 gm. of a 2% aqueous solution of sodium hydroxide and the solution was added to a dropping funnel. A homopolymer of N-vinyl-2-pyrrolidone having an average molecular weight of 40,000 (30 gm.) (GAF-K-30) was separately dissolved in 270 gm. of an aqueous 2% sodium hydroxide solution and poured into a separate dropping funnel. 50 gm. of the furosemide solution and 300 gm. of the polyvinylpyrrolidone solution were charged drop-wise over a period of 15 minutes to a 500 ml. flask and the resulting solution was agitated for 15 minutes at room temperature. The pH of the reaction mixture was about 8.5. The liquid was then evaporated under about 20 mm. of Hg to remove the solvent and the resulting solid was dried under a similar vacuum at 60° C. overnight.

In a screw-top jar, 2 gm. of the solid which was the sodium salt of the complex of poly (N-vinyl-2-pyrrolidone) and furosemide were agitated on a horizontal shaker at room temperature with 20 gm. of distilled water which corresponded with 1.4% of the drug. After about one half hour, a clear solution was obtained. The pH was adjusted to 5.6 with concentrated hydrochloric acid solution. The polymer-furosemide complex remained in solution at this pH.

Additional amounts of the salt, in 2 gm increments, were added to the clear liquid and the pH of the solution was adjusted to the acid side after each addition. After each addition, a clear solution was obtained up to a concentration of 14 gm. of the furosemide complex, which corresponds to 2 gm. of drug. The solubility of furosemide in water is 0.00006 gm./ml. Accordingly, a 1660-fold increase in the solubility of furosemide is obtained with the present invention.

EXAMPLE 4

Quinine (10 gm.) was dissolved in 90 gm. of dimethylformamide and poured into a dropping funnel. 50 gm. of a 50:50 (molar basis) copolymer of vinylpyrrolidone and maleic anhydride (molecular weight of about 40,000) were dissolved in 450 gm. of dimethylformamide and poured into a separate dropping funnel. The two solutions were gradually mixed over a period of 15 minutes at room temperature and atmospheric pressure with agitation in a 2,000 ml. flask. The mixture was stirred for an additional 10 minutes and the flask was then transferred to a rotary evaporator under about 20 mm. of Hg pressure to remove the solvent. The solid remaining after evaporation was dried under a vacuum of 20 ml. Hg at 60° C. overnight.

34 gm. of the complex were transferred to a screw-top jar and mixed with 20 gm. of distilled water on a horizontal shaker for 6 hours at room temperature. After this period, the solid was completely dissolved. The amount of the quinine in the solution was 5.667 gm. Since the solubility of quinine in water is 0.00053 gm./ml., this represents a 534-fold increase in solubility.

EXAMPLE 5

D-threo-(1,1'-dihydroxy-1-p-nitrophenylisopropyl)-chloroacetamide (10 gm.) was dissolved in 90 gm. of ethanol and poured into a dropping funnel. A copolymer of vinylpyrrolidone and a quaternized amine ethoxy methacrylate (GAFQUAT-734) (50 gm.) was dissolved in 450 gm. of ethanol and poured into a separate dropping funnel. The two solutions were gradually mixed over a period of 15 minutes at room temperature and atmospheric pressure with good agitation in a 2000 milliliter flask. The mixture was stirred for an additional 10 minutes and the flask was then transferred to a rotary evaporator under about 20 mm Hg pressure to remove the ethanol solvent. After evaporation, the remaining solid was dried in vacuo at 60° C. overnight.

24 gm. of the solid were transferred to a screw-cap jar where it was mixed with 20 gm. of distilled water on a horizontal shaker for 6 hours at room temperature. After this period, the complex was completely dissolved, that is 4.0 gm. of the D-threo-(1,1'-dihydroxy-1-p-nitrophenylisopropyl) dichloroacetamide was dissolved in 20 gm. water.

As a control, 1 gm. of D-threo-(1,1'-dihydroxy-1-p-nitrophenyisopropyl) dichloroacetamide was placed in a screwcap jar with 99 gm. of distilled water and agitated on a horizontal shaker for 24 hours at room temperature. The solubility of the uncomplexed D-threo-(1,1'-dihydroxy-1-p-nitrophenyisopropyl) dichloroacetamide was found to be 2.5 mg in 1 milliliter of water. Therefore, the increase of solubility achieved by complexation is 80-fold.

EXAMPLE 6

One (1.0) gram bis(4-aminophenyl)-sulfone (Dapsone) —98% active—was dissolved in 40 gm. absolute ethanol. Similarly, 5.0 gm. PVP/K-15 was dissolved in 30 gm. absolute ethanol. The respective solutions were placed in dropping funnels and were mixed dropwise at room temperature in 60 minutes. The mixture was placed in the flask of a rotary evaporator and the solvent was removed in vacuo at 2 mm Hg at 75° C. oil bath temperature. The contents of the flask were placed in a vacuum oven and were dried in vacuo overnight. The dried material was pulverized in a mortar and was passed through a 100 mesh sieve.

1 gm. of the complex containing 0.163 gm of bis(4-aminophenyl)-sulfone was placed in a vial and 1.0 gm. distilled water was added. The vial was placed on a horizontal shaker, and was shaken for 6 hours at room temperature. The complex was completely dissolved in water. Since the . solubility of bis(4-aminophenyl)sulfone is 0.001 gm per 100 ml., the complexation resulted in a 1630-fold increase in solubility.

What is claimed is:

1. A complex of a substantially insoluble organic compound selected from the group consisting of sulfathiazole, furosemide, quinine, trifluralin and dapsone and a polymer selected from the group consisting of solid homopolymers of N-vinyl-2-pyrrolidone and copolymers thereof that are water-soluble, the water solubility of the complex being at least about 25-fold that of the organic compound itself.

2. The complex of claim 1 wherein the polymer has a molecular weight of at least about 1,000.

3. The complex of claim 1 or 2 wherein the polymer has a molecular weight from about 10,000 to 40,000.

4. The complex of claim 1 or 2 wherein the ratio of insoluble compound to polymer is from about 1:1 to 10:1.

5. Th complex of claim 4 wherein the ratio is from about 4:1 to 7:1.

6. The complex of claim 1 or 2 wherein the polymer is a copolymer and the monomer is selected from the group consisting of maleic anhydride, maleic acid, acrylic acid, methacrylic acid, acrylamide, alkylamino acrylates and methacrylates.

7. The complex of claim 6 wherein the amount of said monomer is from about 5 to 50 percent by weight.

8. The complex of claim 1 having a solubility of greater than about 100-fold that of the insoluble compound.

9. A method for preparing the complex of claim 1 comprising preparing a solution of the organic compound and the solid polymer in a mutual solvent, mixing the solution for a period of time to form a solution of the complex in the mutual solvent, and removing the solvent to form the dry complex.

10. The method of claim 9 wherein the mutual solvent is selected from the group consisting of organic solvents, aqueous alkaline solutions and alkanolic alkaline solutions.

11. The method of claim 9 or 10 wherein the concentration of the polymer in the solution is from about 5 to 25 weight percent.

12. The method of claim 9 or 10 wherein the solution is mixed at a pressure from atmospheric to 50 psig, at a temperature from above about 3° C. to below the boiling point of the solvent, for a period from about 5 minutes to 3 hours.

13. The method of claim 9 or 10 wherein the polymer has a molecular weight from about 10,000 to 40,000.

14. The method of claim 9 or 10 wherein the ratio of insoluble compound to polymer is from about 1:1 to 10:1.

15. The method of claim 9 or 10 wherein the polymer is a copolymer and the comonomer is selected from the group consisting of maleic anhydride, maleic acid, acrylic acid, methacrylic acid, acrylamide, alkylamino acrylates and methacrylates.

16. The method of claim 15 wherein the amount of said monomer is from about 5 to 50 percent by weight.

* * * * *